US012115800B2

(12) United States Patent
Arakane

(10) Patent No.: US 12,115,800 B2
(45) Date of Patent: Oct. 15, 2024

(54) LIQUID EJECTING APPARATUS, LIQUID EJECTING METHOD AND NON-TRANSITORY STORAGE MEDIUM STORING INSTRUCTIONS EXECUTABLE BY THE LIQUID EJECTING APPARATUS

(71) Applicant: Brother Kogyo Kabushiki Kaisha, Nagoya (JP)

(72) Inventor: Satoru Arakane, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 155 days.

(21) Appl. No.: 18/054,931

(22) Filed: Nov. 14, 2022

(65) Prior Publication Data

US 2023/0166526 A1 Jun. 1, 2023

(30) Foreign Application Priority Data

Nov. 26, 2021 (JP) ................................ 2021-191941

(51) Int. Cl.
*B41J 2/21* (2006.01)
*B41J 2/165* (2006.01)

(52) U.S. Cl.
CPC ......... *B41J 2/2146* (2013.01); *B41J 2/16579* (2013.01); *B41J 2/2139* (2013.01); *B41J 2/2142* (2013.01)

(58) Field of Classification Search
CPC ........... G02F 1/133512; G02F 1/13394; G02F 1/133516; B41J 11/002; B41J 29/393; B41J 29/38; B41J 2/01; B41J 2/0456; B41J 2/21; G06K 15/02
See application file for complete search history.

(56) References Cited

U.S. PATENT DOCUMENTS

| | | | | |
|---|---|---|---|---|
| 5,734,393 A * | 3/1998 | Eriksen | ................ | G06K 15/107 347/41 |
| 6,318,832 B1 * | 11/2001 | Bates | ..................... | B41J 2/5056 347/15 |
| 9,010,899 B2 * | 4/2015 | Harjee | ................... | H10K 71/00 347/14 |
| 9,337,426 B2 * | 5/2016 | Dowling | ............. | H10K 71/135 |

(Continued)

FOREIGN PATENT DOCUMENTS

JP 2007-296748 A 11/2007

*Primary Examiner* — John Zimmermann
(74) *Attorney, Agent, or Firm* — Scully, Scott, Murphy & Presser, P.C.

(57) ABSTRACT

A liquid ejecting apparatus includes an ejection head, a carriage, a conveyor and a controller configured to, when it is determined that the state of the ejection is in a first state, execute a first printing process and, when it is determined that the state of the ejection is in a second state, execute a second printing process. In the first printing process, (i) a previous pass-printing is performed, (ii) the printed medium is conveyed by a first distance after the previous pass-printing, and (iii) a succeeding pass-printing is performed after the conveyance of the printed medium. In the second printing process, (i) the previous pass-printing is performed, (ii) the printed medium is conveyed by a second distance larger than the first distance after the previous pass-printing, and (iii) the succeeding pass-printing is performed after the conveyance of the printed medium, in the interlaced-printing.

9 Claims, 11 Drawing Sheets

(56) References Cited

U.S. PATENT DOCUMENTS

| | | | | |
|---|---|---|---|---|
| 2005/0270317 | A1* | 12/2005 | Gao | B41J 2/16579 347/8 |
| 2008/0278534 | A1* | 11/2008 | Kim | B41J 29/393 347/19 |
| 2009/0096823 | A1* | 4/2009 | Watt | B41J 29/38 347/10 |
| 2011/0249062 | A1* | 10/2011 | Nakano | B41J 2/2135 347/37 |

* cited by examiner

LIQUID EJECTING APPARATUS, LIQUID EJECTING METHOD AND NON-TRANSITORY STORAGE MEDIUM STORING INSTRUCTIONS EXECUTABLE BY THE LIQUID EJECTING APPARATUS

REFERENCE TO RELATED APPLICATIONS

The present application claims priority from Japanese Patent Application No. 2021-191941, which was filed on Nov. 26, 2021, the disclosure of which is herein incorporated by reference in its entirety.

BACKGROUND ART

The following disclosure relates to a liquid ejecting apparatus used in an image recording apparatus, such as an ink-jet printer, a liquid ejecting method and a non-transitory storage medium storing instructions executable by the liquid ejecting apparatus.

There has been known a conventional ink-jet printer including an ejection head configured to eject a plurality of ink droplets on a printed medium from a plurality of nozzles. The ejection head includes, for example, four nozzle rows. Examples of the four nozzle rows are (i) a cyan-color nozzle row having a plurality of nozzles each configured to eject a plurality of ink droplets with a cyan color, (ii) a magenta-color nozzle row having a plurality of nozzles each configured to eject a plurality of ink droplets with a magenta color, (iii) a black-color nozzle row having a plurality of nozzles each configured to eject a plurality of ink droplets with a black color, and (iv) a yellow-color nozzle row having a plurality of nozzles each configured to eject a plurality of ink droplets with a yellow color. For example, in the above described ink-jet printer, each of the cyan-color nozzle row, the magenta-color nozzle row and the black-color nozzle row has one hundred and eighty nozzles, and the yellow-color nozzle row has ninety nozzles. Resolution of a raster line of each of the cyan color, the magenta color and the black color is 180 dpi, and resolution of a raster line of the yellow color is 90 dpi.

DESCRIPTION

Now, in the conventional ink-jet printer, since the resolution of the raster line of the yellow color is less than the resolution of each of the cyan color, the magenta color and the black color, a pass-printing by the plurality of yellow color nozzles need to be performed a plurality of times to form a desired resolution in a case where color printing is performed while the printed medium is conveyed by a distance between adjacent two nozzles of each of the cyan color, the magenta color and the black color, that is, a single pitch of the nozzles of each of the cyan color, the magenta color and the black color. As a result, a plurality of raster lines, each formed by a particular one nozzle of the plurality of yellow color nozzles and extends in a moving direction of a carriage, continue to one another in a conveying direction. However, in a case where the color of the particular one nozzle is the yellow color nozzles and the particular one yellow color nozzle is in an abnormal state, the raster lines formed by the particular one yellow color nozzle are seen as a white streak. As a result, this deteriorates image quality.

An aspect of the disclosure relates to a liquid ejecting apparatus, a liquid ejecting method and a non-transitory storage medium storing instruction executable by the liquid ejecting apparatus capable of suppressing deterioration of image quality.

In one aspect of the disclosure, a liquid ejecting apparatus includes an ejection head including a nozzle row having a plurality of nozzles arranged in a row at predetermined pitches, a plurality of liquid droplets being ejected on a printed medium from the plurality of nozzles, a carriage configured to move in a moving direction, the ejection head being mounted on the carriage, a conveyor configured to convey the printed medium in a direction intersecting the moving direction, and a controller configured to execute an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction, determining whether a state of ejection of the plurality of liquid droplets of the plurality of nozzles is in a first state or a second state, a particular one nozzle of the plurality of nozzles in the nozzle row ejecting a first amount of liquid by an ejection-instruction to the particular one nozzle of the plurality of nozzles in the first state, a particular one nozzle of the plurality of nozzles ejecting a second amount of liquid less than the first amount of liquid by the same ejection-instruction to the particular one nozzle of the plurality of nozzles in the second state, when it is determined that the state of the ejection of the particular one nozzle of the plurality of nozzles is in the first state, execute a first printing process, the controller being configured, in the first printing process, to: (i) perform a previous pass-printing, (ii) convey the printed medium by the conveyor by a first distance after the previous pass-printing, and (iii) perform a succeeding pass-printing after the conveyance of the printed medium in the interlaced-printing, the first distance corresponding to a first number of pitches of the plurality of nozzles, and when it is determined that the state of the ejection of the particular one nozzle of the plurality of nozzles is in the second state, execute a second printing process, the controller being configured, in the second printing process, to: (i) perform the previous pass-printing, (ii) convey the printed medium by the conveyor by a second distance larger than the first distance after the previous pass-printing, and (iii) perform the succeeding pass-printing after the conveyance of the printed medium, in the interlaced-printing, the second distance corresponding to a second number of pitches of the plurality of nozzles, the second number being larger than the first number.

In another aspect of the disclosure, a liquid ejecting method for a liquid ejecting apparatus is disclosed. The liquid ejecting apparatus includes an ejection head including a nozzle row having a plurality of nozzles arranged in a row at predetermined pitches, a plurality of liquid droplets being ejected on a printed medium from the plurality of nozzles, a carriage configured to move in a moving direction, the ejection head being mounted on the carriage, and a conveyor configured to convey the printed medium in a direction intersecting the moving direction. The liquid ejecting method comprises executing an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction, determining whether a state of ejection of the plurality of liquid droplets of the plurality of nozzles is in a first state or a second state, a particular one nozzle of the plurality of nozzles in the nozzle row ejecting a first amount of liquid by an ejection-instruction to the particular one nozzle of the plurality of nozzles in the first state, a particular one nozzle of the plurality of nozzles ejecting a second amount of liquid less than the first amount of liquid by the same ejection-instruction to the particular one nozzle of the plurality of nozzles in the second state, when it is determined that the state of the ejection of the particular one nozzle of the plurality of nozzles is in the first state, executing a first printing process, in the first printing process, (i) a previous pass-printing being performed, (ii) the printed medium being conveyed by the conveyor by a first distance after the previous pass-printing, and (iii) a succeeding pass-printing being performed after the conveyance of the printed medium, in the interlaced-printing, the first distance corresponding to a first number of pitches of the plurality of nozzles, and when it is determined that the state of the ejection of the particular one nozzle of the plurality of nozzles is in the second state, executing a second printing process, in the second printing process, (i) the previous pass-printing being performed, (ii) the printed medium being conveyed by the conveyor by a second distance larger than the first distance after the previous pass-printing, and (iii) the succeeding pass-printing being performed after the conveyance of the printed medium, in the interlaced-printing, the second distance corresponding to a second number of pitches of the plurality of nozzles, the second number being larger than the first number.

In another aspect of the disclosure, a non-transitory recording medium storing a plurality of instructions executable by a computer of a liquid ejecting apparatus is disclosed. The liquid ejecting apparatus includes an ejection head including a nozzle row having a plurality of nozzles arranged in a row at predetermined pitches, a plurality of liquid droplets being ejected on a printed medium from the plurality of nozzles, a carriage configured to move in a moving direction, the ejection head being mounted on the carriage, and a conveyor configured to convey the printed medium in a direction intersecting the moving direction. When executed by the computer, the plurality of instructions cause the liquid ejecting apparatus to execute an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction, determining whether a state of ejection of the plurality of liquid droplets of the plurality of nozzles is in a first state or a second state, a particular one nozzle of the plurality of nozzles in the nozzle row ejecting a first amount of liquid by an ejection-instruction to the particular one nozzle of the plurality of nozzles in the first state, a particular one nozzle of the plurality of nozzles ejecting a second amount of liquid less than the first amount of liquid by the same ejection-instruction to the particular one nozzle of the plurality of nozzles in the second state, when it is determined that the state of the ejection of the particular one nozzle of the plurality of nozzles is in the first state, execute a first printing process, in the first printing process, (i) a previous pass-printing being performed, (ii) the printed medium being conveyed by the conveyor by a first distance after the previous pass-printing, and (iii) a succeeding pass-printing being performed after the conveyance of the printed medium, in the interlaced-printing, the first distance corresponding to a first number of pitches of the plurality of nozzles, and when it is determined that the state of the ejection of the particular one nozzle of the plurality of nozzles is in the second state, execute a second printing process, in the second printing process, (i) the previous pass-printing being performed, (ii) the printed medium being conveyed by the conveyor by a second distance larger than the first distance after the previous pass-printing, and (iii) the succeeding pass-printing being performed after the conveyance of the printed medium, in the interlaced-printing, the second distance corresponding to a second number of pitches of the plurality of nozzles, the second number being larger than the first number.

The objects, features, advantages, and technical and industrial significance of the present disclosure will be better understood by reading the following detailed description of the embodiments, when considered in connection with the accompanying drawings, in which.

There will be described a liquid ejecting apparatus, a liquid ejecting method and a non-transitory storage medium storing instructions executable by the liquid ejecting apparatus of embodiments of the present disclosure with reference to drawings. In the following description, each of the liquid ejecting apparatus, the liquid ejecting method and the non-transitory storage medium storing instructions executable by the liquid ejecting apparatus is an example of the present disclosure. Accordingly, the disclosure is not limited to the details of the illustrated embodiment and modifications, but may be embodied with various changes and modifications, which may occur to those skilled in the art, without departing from the spirit and scope of the disclosure.

Figure 1:
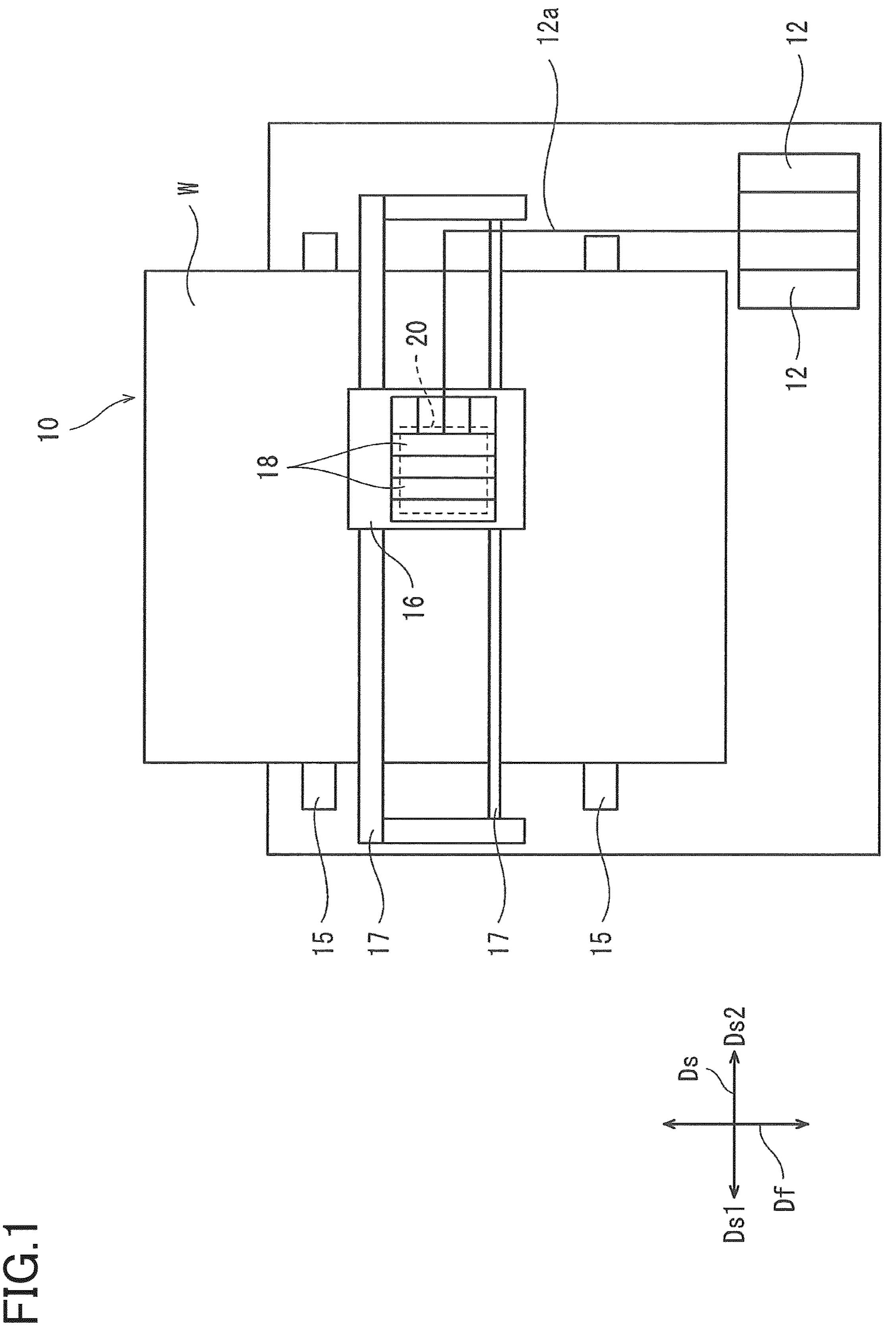
FIG. 1 is a schematic plan view illustrating a configuration of a liquid ejecting apparatus.
Figure 2:
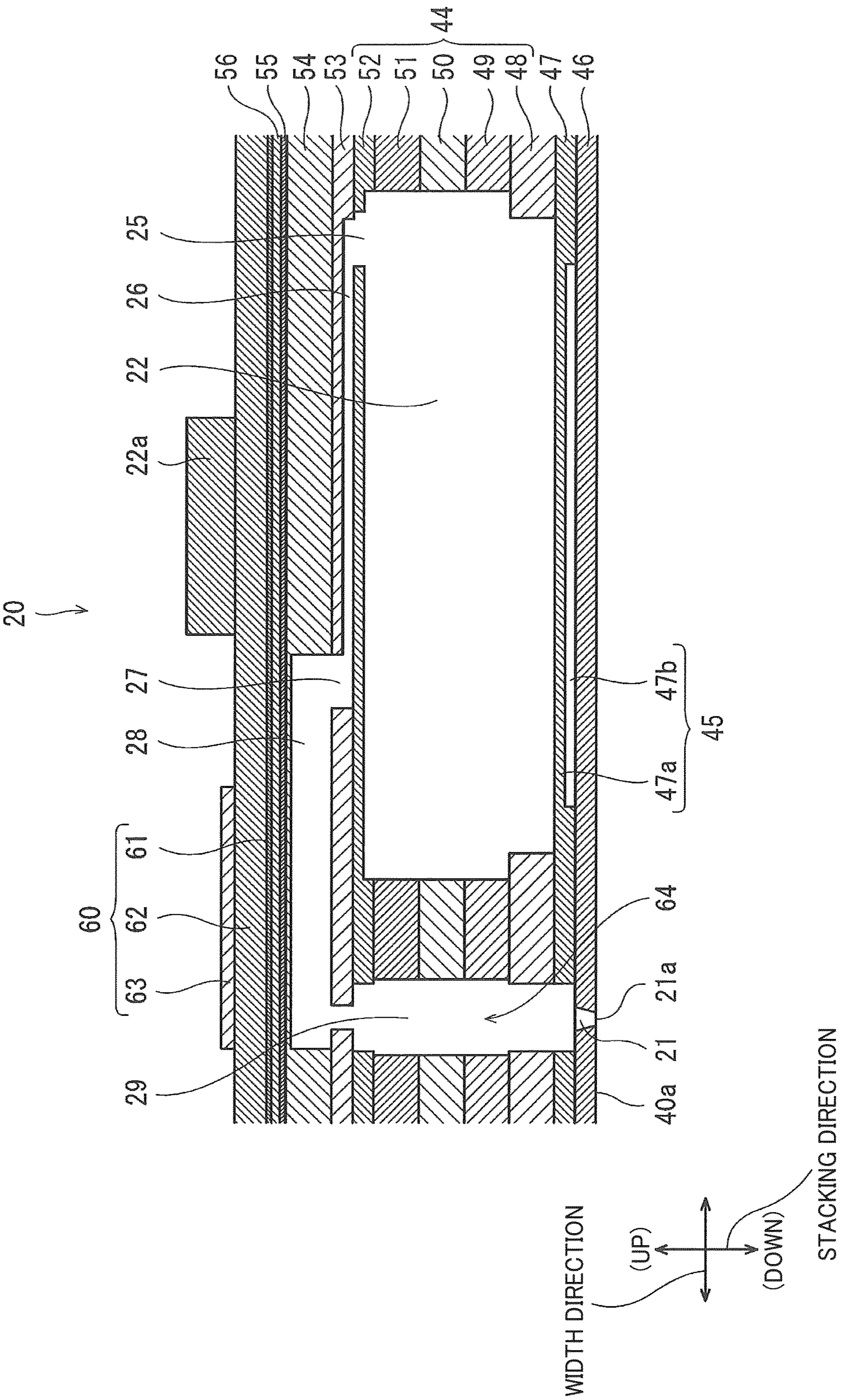
FIG. 2 is a cross-sectional view illustrating an ejection head of the liquid ejecting apparatus illustrated in FIG. 1.
Figure 3:
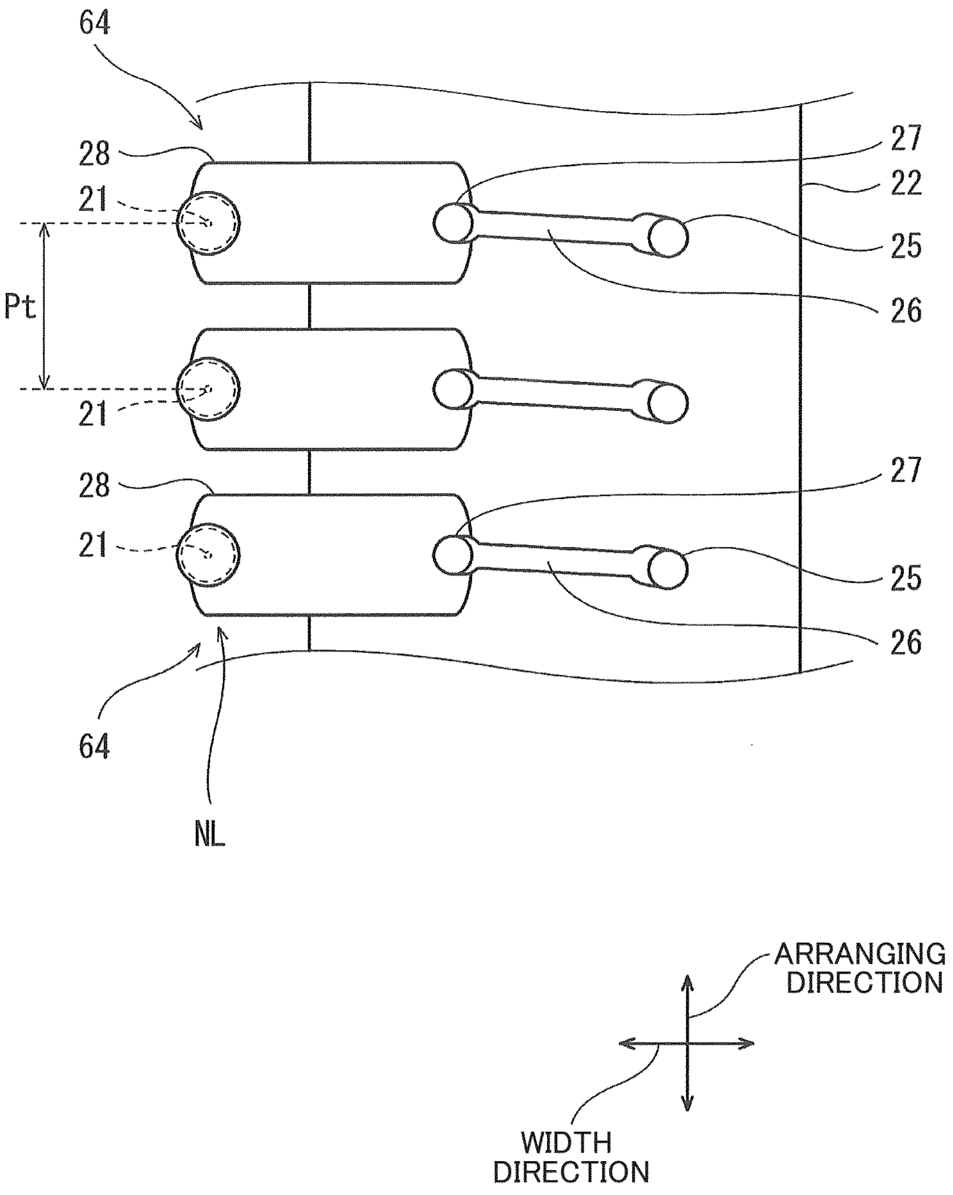
FIG. 3 is a plan view illustrating a nozzle row in which a plurality of nozzles illustrated in FIG. 2 are arranged at predetermined pitches.

FIG. 1 is a schematic plan view illustrating a configuration of a liquid ejecting apparatus 10 related to an embodiment of the present disclosure. FIG. 2 is a cross-sectional view illustrating an ejection head 20 of the liquid ejecting apparatus 10 illustrated in FIG. 1. FIG. 3 is a plan view illustrating a nozzle row NL in which a plurality of nozzles 21 are arranged at predetermined pitches Pt. As illustrated in FIG. 1, the liquid ejecting apparatus 10 of the present embodiment uses ink as an example of liquid, and ejects a plurality of ink droplets as examples of a plurality of liquid droplets. The liquid ejecting apparatus 10 includes reservoir tanks 12, a carriage 16, the ejection head 20, a pair of conveying rollers 15, a pair of guide rails 17 and sub-tanks 18. It is noted that a printed medium W is placed on a platen, which is not illustrated, in the liquid ejecting apparatus 10.

The ejection head 20 is mounted on the carriage 16. The carriage 16 is supported by the pair of guide rails 17 extending in a moving direction Ds which is orthogonal to a conveying direction Df of the printed medium W, an example of which is a printing sheet. The carriage 16 reciprocates along each of the guide rails 17 in the moving direction Ds. As a result of this, the ejection head 20 reciprocates in the moving direction Ds. The reservoir tanks 12 and the ejection head 20 are connected to each other by a tube 12*a*. It is noted that the moving direction Ds includes a first moving direction Ds1 and a second moving direction Ds2 which is an opposite direction to the first moving direction Ds1.

The ejection head 20 is an ink-jet head configured to eject the plurality of ink droplets. The ejection head 20 includes the plurality of nozzles 21, which will be described below. The plurality of nozzles 21 ejects, for example, the plurality of ink droplets with a yellow (Y) color, the plurality of ink droplets with a magenta (M) color, the plurality of ink droplets with a cyan (C) color, and the plurality of ink droplets with a black color (K). As illustrated in FIG. 3, the ejection head 20 includes the nozzle row NL in which the plurality of nozzles 21 each of which ejects the plurality of ink droplets on the printed medium W are arranged at the predetermined pitches Pt. The nozzle row NL extends in an arranging direction which is the same direction as the conveying direction Df. It is noted that the details of the ejection head 20 will be described below.

The ink is stored in the reservoir tank 12. The reservoir tanks 12 are connected to the ejection head 20 via ink flow passages so as to supply the ink to the ejection head 20. The reservoir tanks 12 are respectively provided for kinds of ink. For example, the four reservoir tanks 12 are provided, and ink with each color is stored in each of the reservoir tanks 12. The four sub-tanks 18, for example, are mounted on the carriage 16. Each of the sub-tanks 18 is connected to a corresponding one of the reservoir tanks 12 via the tube 12*a*. It is noted that only one tube 12*a* is illustrated in FIG. 1 so as to simplify the configuration of the liquid ejecting apparatus 10, however, the tube 12*a* is provided for each of combinations between the reservoir tanks 12 and the sub-tanks 18.

The pair of conveying rollers 15 is arranged along the moving direction Ds in parallel to each other. The pair of conveying rollers 15 rotates when a conveying motor 31 (see FIG. 4), which will be described below, is driven. As a result of this, the printed medium W placed on the platen is conveyed in the conveying direction Df. It is noted that the pair of conveying rollers 15 and the conveying motor 31 corresponds to a conveyor.

As illustrated in FIG. 2, the ejection head 20 includes a plurality of nozzles 21 from which the plurality of ink droplets are ejected. The ejection head 20 includes a stacked body including a flow passage forming body and a volume changing unit. A plurality of liquid flow passages are formed in the flow passage forming body, and a plurality of nozzle openings 21*a* are formed on a nozzle surface 40*a* which is a lower surface of the flow passage forming body. Moreover, the volume changing unit is configured to change a volume of the plurality of liquid flow passages when being driven. At this time, the ink is ejected while a meniscus is vibrated in each of the plurality of nozzle openings 21*a*.

The flow passage forming body of the ejection head 20 is a stacked body constituted by a plurality of plates, and the volume changing unit includes a vibrating plate 55 and an actuator 60, which is a plurality of piezo-electric elements. The actuator 60 applies pressure on the ink stored in the pressure chamber 28, and the plurality of ink droplets are ejected, by the pressure, from the plurality of nozzles 21 communicating with the pressure chamber 28. An insulating layer 56 is placed on the vibrating plate 55, and a common electrode 61, which will be described below, is placed on the insulating layer 56.

The plurality of plates include a nozzle plate 46, a spacer plate 47, a first flow passage plate 48, a second flow passage plate 49, a third flow passage plate 50, a fourth flow passage plate 51, a fifth flow passage plate 52, a sixth flow passage plate 53 and a seventh flow passage plate 54, which are stacked in order from below. It is noted that a manifold plate 44 is constituted by the first flow passage plate 48, the second flow passage plate 49, the third flow passage plate 50, the fourth flow passage plate 51 and the fifth flow passage plate 52.

Various kinds of holes and grooves of all sizes are formed in each of the plurality of plates. The plurality of nozzles 21, a plurality of individual flow passages 64 and a manifold 22 are formed, as the plurality of flow passages, by combining the holes and the grooves, in the flow passage forming body constituted by the stacked plurality of plates.

The plurality of nozzles 21 are formed so as to pierce through the nozzle plate 46 in a stacking direction. The plurality of nozzle openings 21*a*, which correspond to tip ends of the plurality of nozzles 21, are formed on the nozzle surface 40*a* of the nozzle plate 46 so as to be arranged in an arranging direction which is the same direction as the conveying direction Df.

The manifold 22 supplies the ink to the pressure chamber 28 to which ejecting pressure of the plurality of ink droplets is applied. The manifold 22 extends in the arranging direction of the plurality of nozzle openings 21*a*, and the manifold 22 is connected to an end of each of the plurality of individual flow passages 64. That is, the manifold 22 functions as a common flow passage of the ink. The manifold 22 is formed by stacking, in the stacking direction, (i) a piercing hole which pierces from the first flow passage plate 48 to the fourth flow passage plate 51 in the stacking direction and (ii) a recess recessed from a lower surface of the fifth flow passage plate 52.

The nozzle plate 46 is disposed below the spacer plate 47. The spacer plate 47 is made of stainless steel, for example. The spacer plate 47 has a recessed portion 45 in which a thin portion constituting a damper portion 47*a* and a damper space 47*b* are formed by recessing the spacer plate 47 in a thickness direction of the spacer plate 47 from one surface of the spacer plate 47 nearer to the nozzle plate 46 than the other surface of the spacer plate 47 by a half etching method, for example. According to this configuration, the damper space 47*b* as a buffer space is formed between the manifold 22 and the nozzle plate 46.

A supplying port 22*a* communicates with the manifold 22. The supplying port 22*a* has a tubular shape, for example, and the supplying port 22*a* is located at a first end of the ejection head 20 in the arranging direction.

The plurality of individual flow passages 64 are connected to the manifold 22. Upstream ends of the plurality of individual flow passages 64 are connected to the manifold 22, and downstream ends of the plurality of individual flow passages 64 are connected to base ends of the plurality of nozzles 21. The plurality of individual flow passages 64 are constituted by a first communicating opening 25, a supply narrowing passage 26 which is an individual narrowing passage, a second communicating opening 27, the pressure chamber 28 and a descender 29, and these configuration elements are arranged in this order. The pressure chamber 28 communicates with the plurality of nozzles 21.

A lower end of the first communicating opening 25 is connected to an upper end of the manifold 22. The first communicating opening 25 extends upward in the stacking direction from the manifold 22, and pierces through an upper portion in the fifth flow passage plate 52 in the stacking direction.

An upstream end of the supply narrowing passage 26 is connected to an upper end of the first communicating opening 25. The supply narrowing passage 26 is formed by a half etching method, for example, and the supply narrowing passage 26 is constituted by a groove recessed from a lower surface of the sixth flow passage plate 53. Moreover, an upstream end of the second communicating opening 27 is connected to a downstream end of the supply narrowing passage 26. The second communicating opening 27 extends upward in the stacking direction from the supply narrowing passage 26, and is formed so as to pierce through the sixth flow passage plate 53 in the stacking direction.

An upstream end of the pressure chamber 28 is connected to a downstream end of the second communicating opening 27. The pressure chamber 28 is formed so as to pierce through the seventh flow passage plate 54 in the stacking direction.

The descender 29 is formed so as to pierce through the spacer plate 47, the first flow passage plate 48, the second flow passage plate 49, the third flow passage plate 50, the fourth flow passage plate 51, the fifth flow passage plate 52 and the sixth flow passage plate 53 in the stacking direction, and the descender 29 is disposed on a left side of the manifold 22 in a width direction. An upstream end of the descender 29 is connected to a downstream end of the pressure chamber 28, and a downstream end of the descender 29 is connected to the base ends of the plurality of nozzles 21. The plurality of nozzles 21 overlay on the descender 29 when viewed from the stacking direction, for example, and the plurality of nozzles 21 are disposed at a center of the descender 29 in the width direction orthogonal to the stacking direction.

The vibrating plate 55 is stacked on the seventh flow passage plate 54 and covers an upper end opening of the pressure chamber 28.

The actuator 60 includes the common electrode 61, a piezoelectric layer 62 and a plurality of individual electrodes 63, which are stacked in this order from below. The common electrode 61 covers the entire surface of the vibrating plate 55 via the insulating layer 56. The piezoelectric layer 62 covers the entire surface of the common electrode 61. Each of the individual electrodes 63 is provided for a corresponding one of pressure chambers 28, and disposed on the piezoelectric layer 62. The single actuator 60 is constituted by the single individual electrode 63, the common electrode 61 and a portion of the piezoelectric layer 62 which is interposed between the single individual electrode 63 and the common electrode 61.

Each of the individual electrodes 63 is electrically connected to the driver IC. The driver IC generates driving signals by receiving control signals from a controller 71, which will be described below, and the driver IC applies the driving signals to each of the individual electrodes 63. On the other hand, the common electrode 61 is kept at ground potential at all times. In this configuration, an active part of the piezoelectric layer 62 expands and contracts together with the common electrode 61 and the individual electrode 63 in a plane direction in accordance with the driving signals. The vibrating plate 55 deforms in accordance with the expansions and the contractions of the piezoelectric layer 62 so as to change a volume of the pressure chamber 28. As a result of this, ejection pressure by which each of the plurality of ink droplets is ejected from a corresponding one of the plurality of nozzles 21 is applied to the pressure chamber 28.

In the ejection head 20, the supplying port 22*a* is connected to the sub-tank 18 via a tube. When a pressurizing pump provided for the tube is driven, ink flows into the manifold 22 from the sub-tank 18 through the tube and the supplying port 22*a*. Then, the ink flows into the supply narrowing passage 26 from the manifold 22 through the first communicating opening 25, and the ink flows into the pressure chamber 28 from the supply narrowing passage 26 through the second communicating opening 27. Then, the ink flows to the descender 29, and the ink flows into the plurality of nozzles 21 from the descender 29. Here, when the ejection pressure is applied to the pressure chamber 28 by the actuator 60, the ink droplet is ejected from the corresponding one of the plurality of nozzle openings 21*a*.

Next, there will be described the above described configuration elements and other configuration elements of the liquid ejecting apparatus 10 in the present embodiment with reference to a block diagram.

Figure 4:
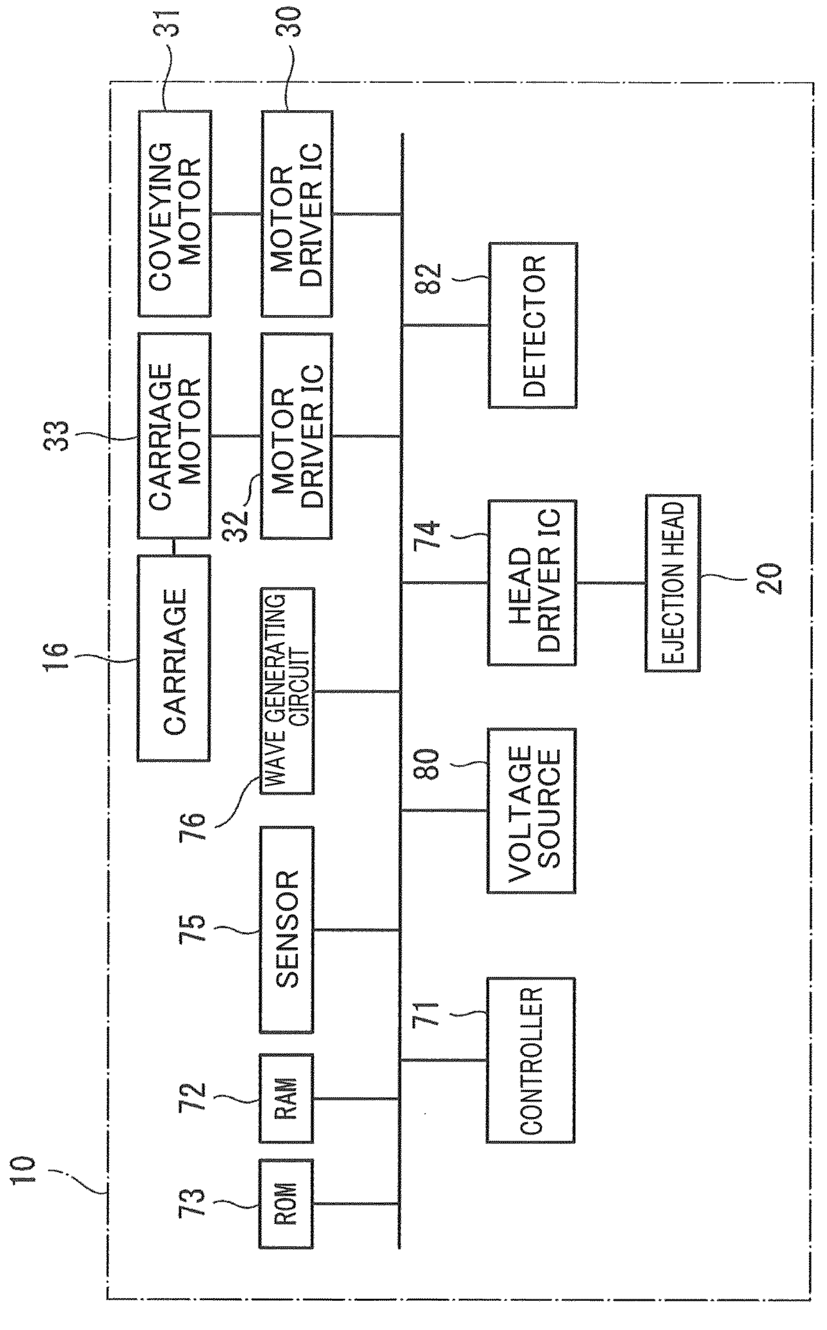
FIG. 4 is a block diagram illustrating a configuration of the liquid ejecting apparatus illustrated in FIG. 1.

As illustrated in FIG. 4, the liquid ejecting apparatus 10 includes the controller 71, constituted by a CPU, which corresponds to a computer, a RAM 72, a ROM 73, a head driver IC 74, a sensor 75, a wave generating circuit 76, a voltage source 80, a detector 82, a motor driver ICs 30, 32, the conveying motor 31 and a carriage motor 33 in addition to the above described configuration elements. It is noted that the controller 71 corresponds to an interlaced-printing instruction means, a determining means, a first printing processing means and a second printing processing means.

The controller 71 executes a pass-printing by the ejection head 20 in which the plurality of ink droplets are ejected from the plurality of nozzles 21 while the carriage 16 is moved in the moving direction Ds. The controller 71 executes the pass-printing twice. As a result of this, the controller 71 can execute an interlaced-printing in which a partial image having resolution higher than an image constituted by dots spaced at the predetermined pitches Pt of the plurality of nozzles 21 is formed on the printed medium W. As described below, in the present embodiment, it is noted that the pass-printing by the ejection head 20 is executed three times.

Moreover, the controller 71 determines whether a state of ejection of the plurality of ink droplets of the plurality of nozzles 21 in the nozzle row NL is a first state or a second state. The first state is a state in which an amount of the plurality of ink droplets by an ejection-instruction from the controller 71 to a particular one nozzle of the plurality of nozzles 21 is a first amount, and the second state is a state in which an amount of the plurality of ink droplets by the same ejection-instruction from the controller 71 to the same particular one nozzle of the plurality of nozzles 21 is a second amount less than the first amount. The first state is a state where the ejection of the plurality of ink droplets from the particular one nozzle of the plurality of nozzles 21 is in a normal state, and the second state is a state where the ejection of the plurality of ink droplets from the particular one nozzle of the plurality of nozzles 21 is not in the normal state, in other words, is in an abnormal state. It is noted that a method for determining whether the state of the ejection of the plurality of ink droplets of the particular one nozzle of the plurality of nozzles 21 is in the normal state or not will be described below.

Moreover, the controller 71 executes a first printing process when it is determined that the state of the ejection of the particular one nozzle 21 is in the first state. The first printing process is a process in which, in the interlaced-printing, (i) a previous pass-printing is performed, (ii) the printed medium W is conveyed by the pair of conveying rollers 15 by a first distance which is a distance corresponding to a predetermined number of the predetermined pitches Pt, and then (iii) a succeeding pass-printing is performed. On the other hand, the controller 71 executes a second printing process when it is determined that the state of the ejection of the particular one nozzle 21 is in the second state. The second printing process is a process in which, in the interlaced-printing, (i) a previous pass-printing is performed, (ii) the printed medium W is conveyed by the pair of conveying rollers 15 by a second distance which is a distance corresponding to a predetermined number of the predetermined pitches Pt and which is less than the first distance, and then (iii) a succeeding pass-printing is performed. It is noted that the first printing process and the second printing process will be described below.

The sensor 75 is a jamming detecting sensor, and the sensor 75 is configured to detect jamming of the printed medium W, that is, a state in which a paper jam occurs. The controller 71 receives a result detected by the sensor 75.

The wave generating circuit 76 generates driving waves including driving signals for driving the actuator 60. The driving signals includes (i) ejection-driving signals by which pressure is applied on the ink in the pressure chamber 28 such that the plurality of ink droplets are ejected from the plurality of nozzles 21, (ii) non-ejection-driving signals by which pressure is applied on the ink in the pressure chamber 28 such that meniscuses in the plurality of nozzles 21 and the ink in the pressure chamber 28 and so on are vibrated or agitated while the plurality of ink droplets are not ejected from the plurality of nozzles 21, and (iii) non-vibrating signals by which meniscuses in the plurality of nozzles 21 are not vibrated.

The RAM 72 stores printing jobs (image data) and ejection data received from external PCs and so on. Moreover, the ROM 73 stores a liquid ejecting program used in the liquid ejecting apparatus 10 in the present embodiment, a control program used for executing various data processes and so on.

The voltage source 80 applies a high voltage to an electrode 81 (see FIG. 10), which will be described below, when it is detected whether the state of the ejection of the particular one nozzle of the plurality of nozzles 21 is in the normal state or the abnormal state. The detector 82 detects a change of voltage caused by the plurality of ink droplets which has landed on the electrode 81 when it is detected whether the state of the ejection of the particular one nozzle of the plurality of nozzles 21 is in the normal state or the abnormal state. It is noted that a detailed configuration of detecting the abnormality of the particular one nozzle of the plurality of nozzles 21 will be described below.

The head driver IC 74 causes the ejection head 20 to eject the plurality of ink droplets by an instruction from the controller 71. The motor driver IC 30 performs a driving control of the conveying motor 31 by an instruction from the controller 71. The conveying motor 31 conveys the printed medium W in the conveying direction Df by driving the pair of conveying rollers 15. Moreover, the motor driver IC 32 performs a driving control of the carriage motor 33 by an instruction from the controller 71. The carriage motor 33 moves the ejection head 20 in the moving direction Ds by moving the carriage 16.

Figure 5:
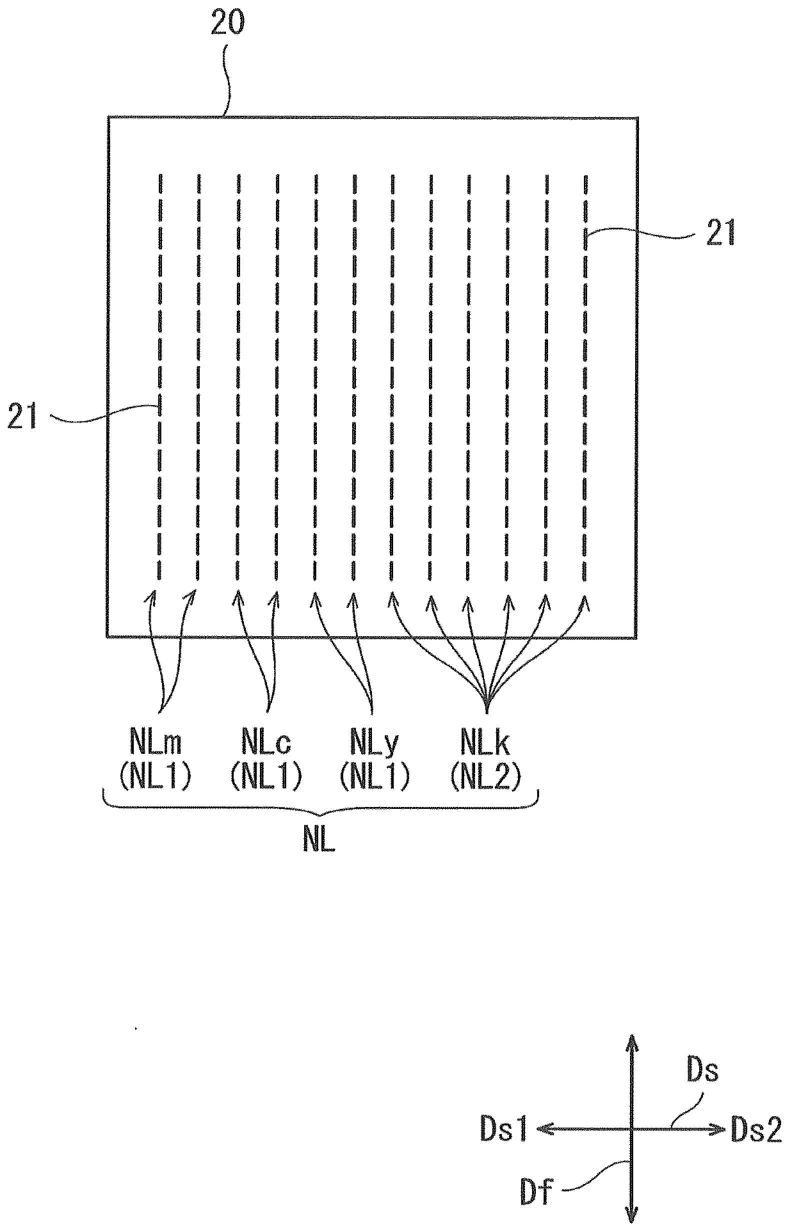
FIG. 5 is a plan view illustrating a detailed configuration of the ejection head illustrated in FIG. 1.
Figure 6:
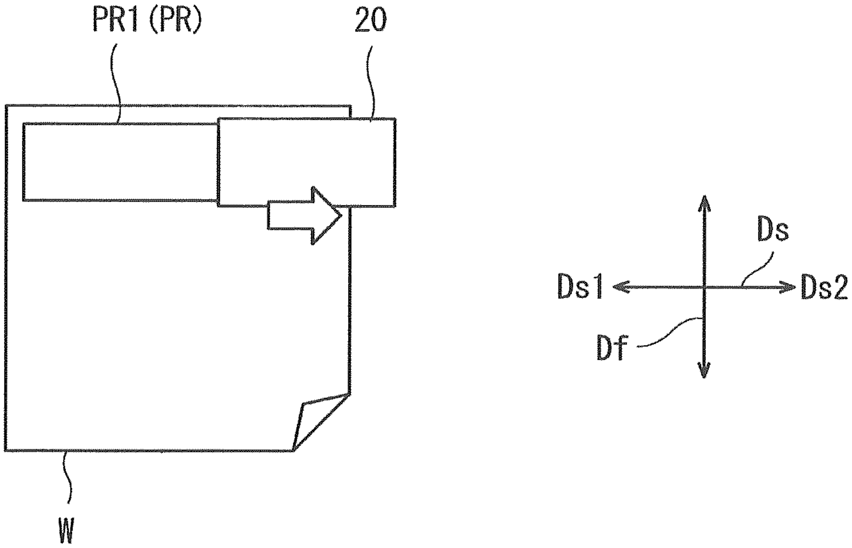
FIG. 6 is a view for explaining a partial image formed by the ejection head illustrated in FIG. 5.
Figure 7:
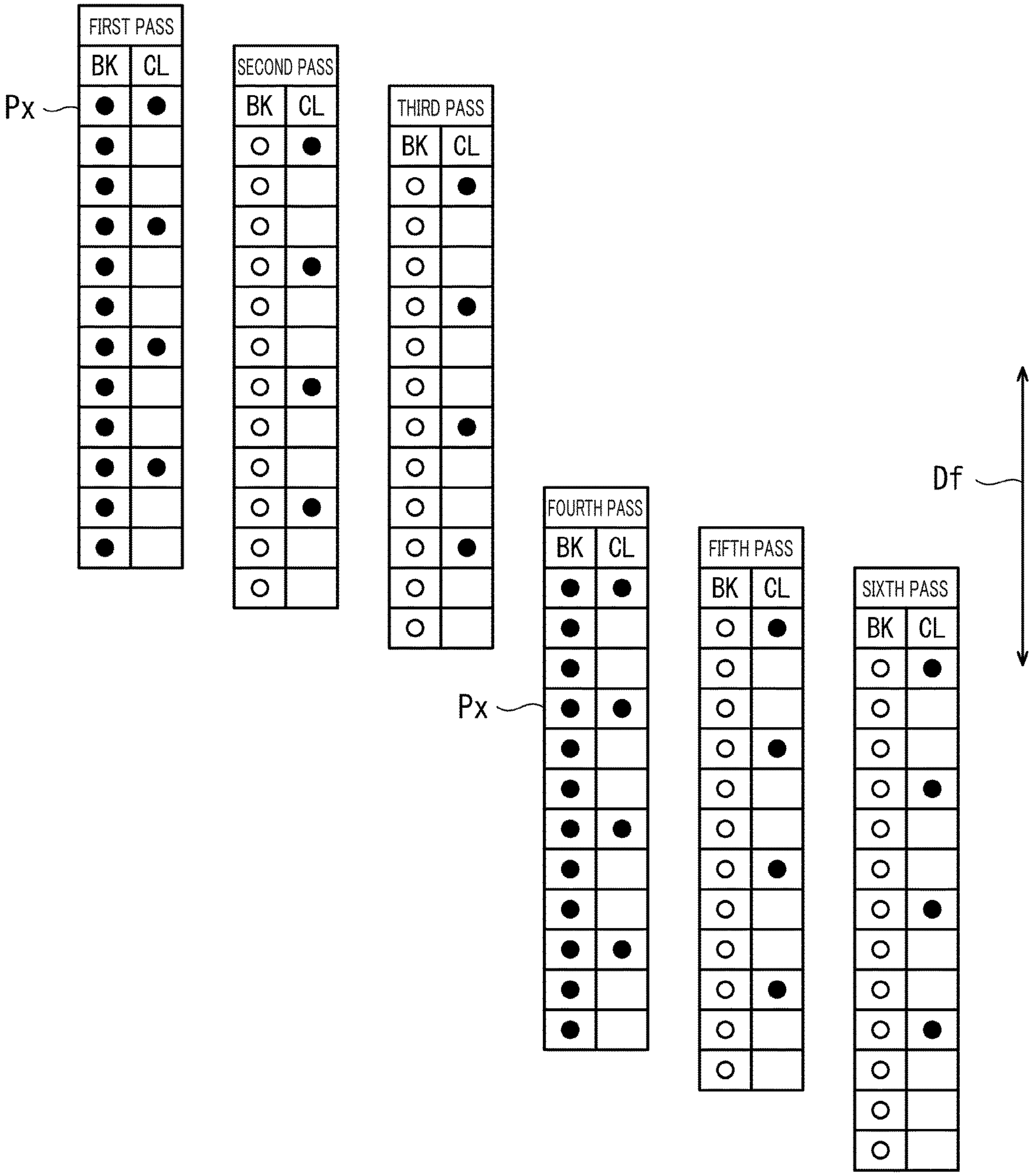
FIG. 7 is a view for explaining a pass-printing by the ejection head illustrated in FIG. 5.

FIG. 5 is a plan view illustrating a detailed configuration of the ejection head 20. FIG. 6 is a view for explaining the partial image PR formed by the ejection head 20. FIG. 7 is a view for explaining the pass-printing by the ejection head 20 illustrated in FIG. 5. It is noted that "CL" in FIG. 7 indicates the plurality of nozzles 21 in any one of the nozzle row NLm, the nozzle row NLc and the nozzle row NLy, which will be described below. As illustrated in FIG. 5, the ejection head 20 in the present embodiment includes the twelve nozzle rows NL, for example. The twelve nozzle rows NL includes the two nozzle rows NLm configured to eject the magenta color ink droplets, the two nozzle rows NLc configured to eject the cyan color ink droplets, the two nozzle rows NLy configured to eject the yellow color ink droplets, and the six nozzle rows NLk configured to eject the black color ink droplets.

The two nozzle rows NLm, the two nozzle rows NLc, the two nozzle rows NLy, and the six nozzle rows NLk are arranged in this order from the first moving direction Ds1 to the second moving direction Ds2, that is, arranged in the moving direction Ds. The arranging order of the nozzle rows NL is not limited to this. The printing resolution by the ink ejected from the nozzle rows NLk is 300 dpi resolution, for example, and the printing resolution by the ink ejected from the nozzle rows NLm, NLc and NLy is 100 dpi resolution, for example. Accordingly, in a case where a color printing at, for example, 600 dpi by 300 dpi resolution is performed, the pass-printing by the nozzle rows NLm, NLc and NLy need to be performed three times with respect to the single pass-printing by the nozzle rows NLk. In this way, the ejection head 20 includes a high-density nozzle row NL2 (the nozzle rows NLk) and three low-density nozzle rows NL1 (the nozzle rows NLm, NLc, NLy) each of which is a nozzle row having a smaller number of the plurality of nozzles 21 than the high-density nozzle row NL2. The high-density nozzle row NL2 is a nozzle row by which the pass-printing is performed once while each of the partial images PR, which is a part of the whole image, is formed in the color printing, and each of the three low-density nozzle rows NL1 is a nozzle row by which the pass-printing is performed three times while each of the partial images PR is formed in the color printing.

The ejection head 20 can perform a one-way-direction printing and a two-way-direction printing when forming the partial image. In a case where the controller 71 performs the two-way-direction printing, for example, the plurality of ink droplets are ejected from the ejection head 20 while the ejection head 20 is moved in each of the first moving direction Ds1 and the second moving direction Ds2 of the moving direction Ds by the carriage 16. In this case, as illustrated in FIG. 6, the controller 71 controls the ejection head 20 to eject the plurality of ink droplets while the controller 71 controls the carriage motor 33 to move the ejection head 20, for example, in the second moving direction Ds2 in the first scanning operation of the carriage 16. As a result of this, a partial image PR1 by the first scanning operation of the plurality of partial images PR constituting the whole image is formed. It is noted that the controller 71 controls the ejection head 20 to eject the plurality of ink droplets while the ejection head 20 is moved in the first moving direction Ds1 in the second scanning operation of the carriage 16.

In the present embodiment, as described above, the pass-printing by each of the nozzle rows NLm, NLc, NLy is performed three times with respect to the single pass-printing by the nozzle row NLk in the color printing. In this case, as illustrated in FIG. 7, the ejection of the plurality of ink droplets by the plurality of nozzles 21 in the nozzle row NLk is performed once per one pixel Px in the first scanning operation (the first pass) of the carriage 16. On the other hand, the ejection of the plurality of ink droplets by each of the plurality of nozzles 21 in any one of the nozzle rows NLm, NLc, NLy is performed once per three pixels Px in the first scanning operation of the carriage 16. Then, the printed medium W is conveyed by a distance corresponding to one pixel Px, that is a distance between two pixels PX adjacent to each other, in the conveying direction Df before each of the second scanning operation (the second pass) and the third scanning operation (the third pass) of the carriage 16. The ejection of the plurality of ink droplets by one nozzle of the plurality of nozzles 21, that is, the one nozzle is a nozzle which has ejected the plurality of ink droplets in the first scanning operation, in any one of the nozzle rows NLm, NLc, NLy is performed, as similar to the ejection in the first scanning operation, once per three pixels Px while the ejection of the plurality of ink droplets by the plurality of nozzles 21 in the nozzle row NLk is not performed in each of the second scanning operation and the third scanning operation of the carriage 16.

As described above, after forming the partial image PR1 by a total of three scanning operations of the carriage 16, the controller 71 controls the conveying motor 31 to convey the printed medium W by a predetermined distance in the conveying direction Df. It is noted that the predetermined distance will be described below. Then, the controller 71 performs the ejection of the plurality of ink droplets in each of the fourth scanning operation, the fifth scanning operation and the sixth scanning operation of the carriage 16 to form a next partial image PR2 in the similar manner to the ejection of the plurality of ink droplets in each of the first scanning operation, the second scanning operation and the third scanning operation of the carriage 16. The controller 71 controls the ejection head 20 to form the plurality of partial images PR by repeating the above described operations, and the whole image is formed by the plurality of partial images PR.

Figure 8:
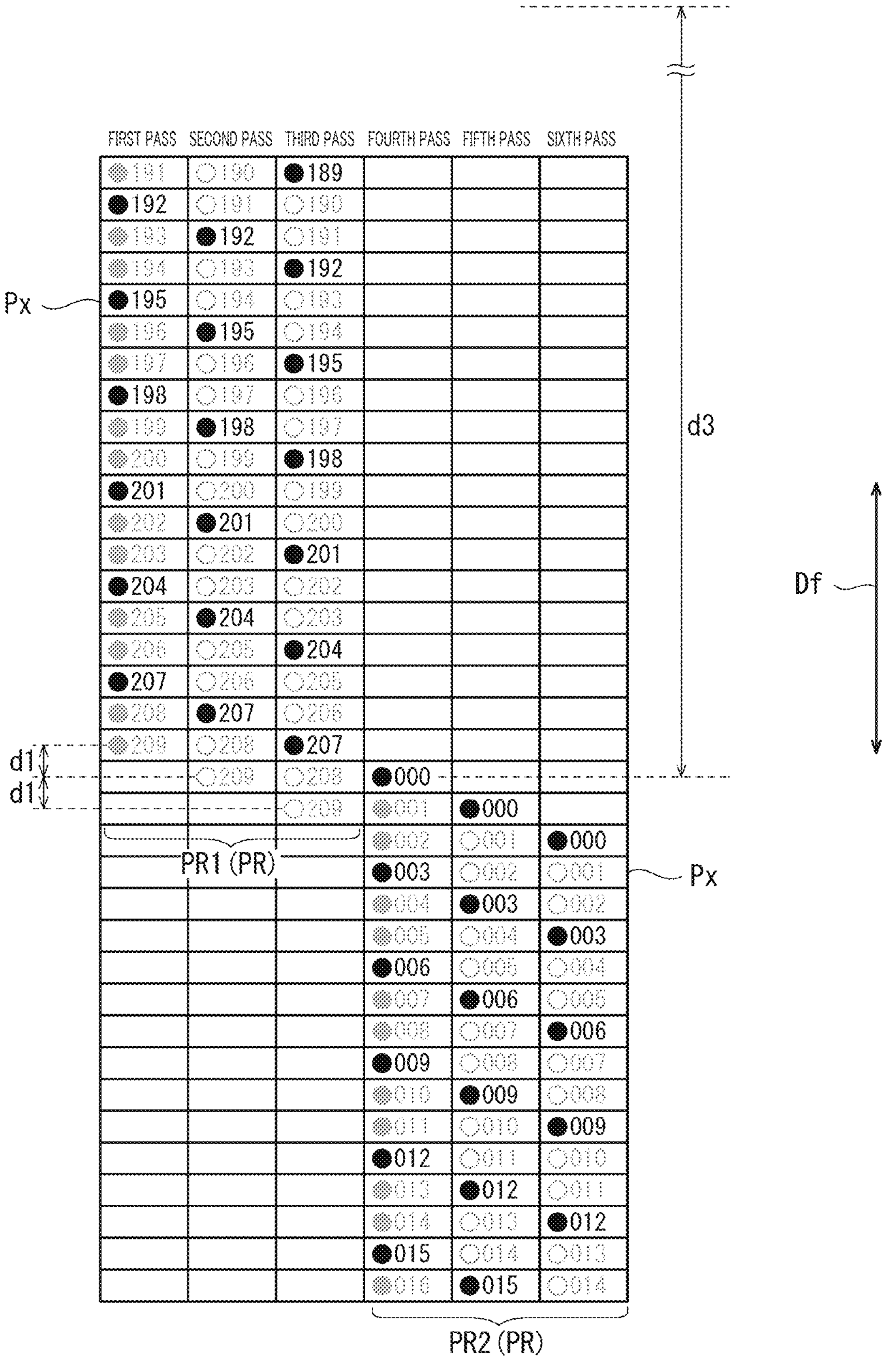
FIG. 8 is a view for explaining a first printing process executed by a controller.

Here, there will be described the first printing process and the second printing process executed by the controller 71 with reference to the drawings. FIG. 8 is a view for explaining the first printing process executed by the controller 71, and FIG. 9 is a view for explaining the second printing process executed by the controller 71.

As described above, when it is determined that the state of the ejection is in the first state, the controller 71 executes the first printing process. That is, the controller 71 executes the first printing process in a case where the ejection of the plurality of ink droplets by the particular one nozzle of the plurality of nozzles 21 is in the normal state. There will be described in details the first printing process below.

Figure 9:
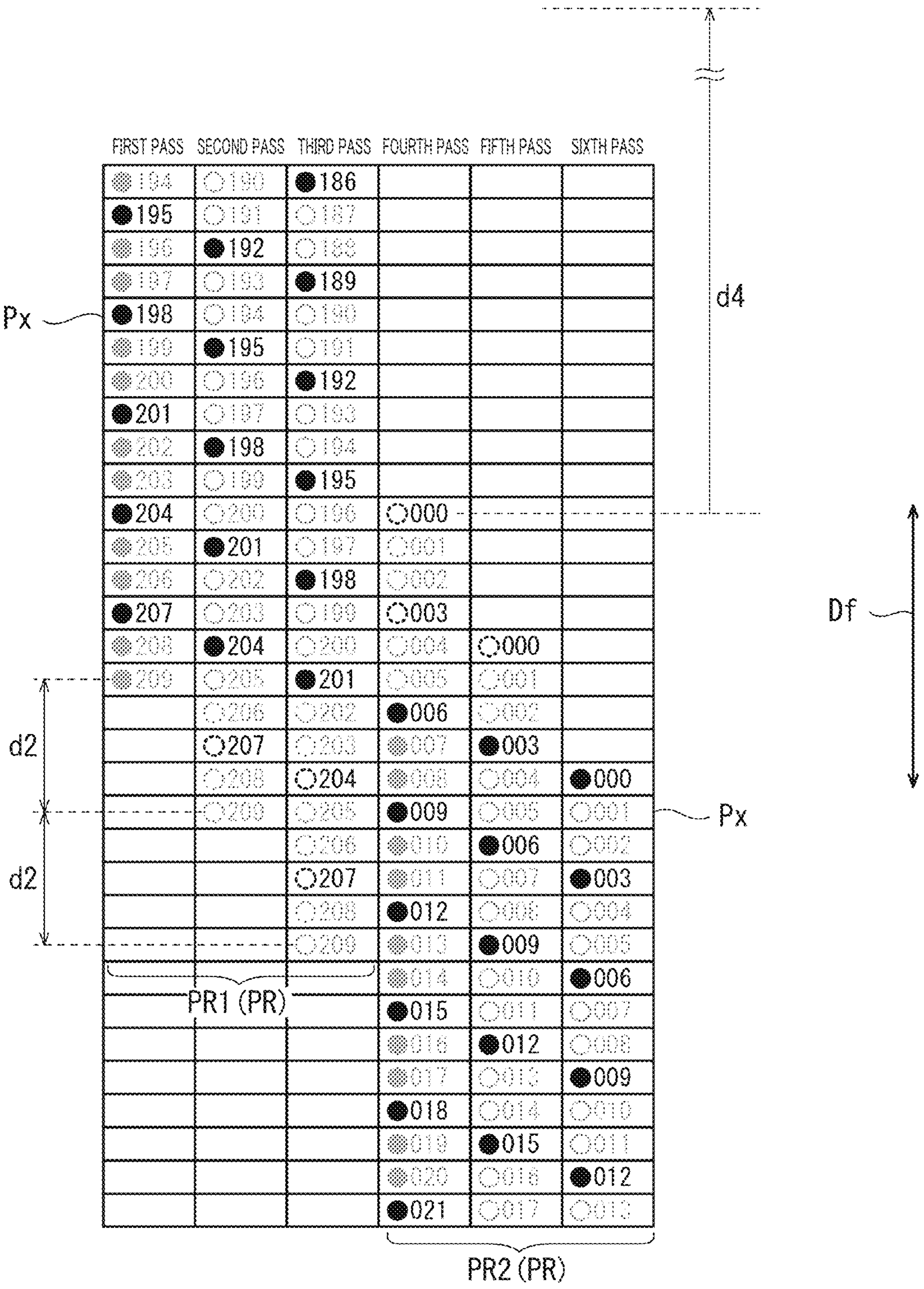
FIG. 9 is a view for explaining a second printing process executed by the controller.

In FIG. 8 and FIG. 9, common nozzle numbers assigned along the conveying direction Df are respectively assigned to the plurality of nozzles 21 in the nozzle row NLk and the plurality of nozzles 21 in each of the nozzle rows NLm, NLc, NLy. The common nozzle numbers are continuously assigned to the plurality of nozzles 21 from a first end to a second end thereof in conveying direction Df in numerical ascending order from "000" to "209". That is, the two hundred and ten nozzles 21 in the nozzle row NLk and the two hundred and ten nozzles 21 in each of the nozzle rows NLm, NLc, NLy are provided along the conveying direction Df. It is noted that the number of the plurality of nozzles 21 is an example of the disclosure, the number of the plurality of nozzles 21 may be set to any number.

In FIG. 8, the plurality of nozzles 21 in the nozzle row NLk from which the plurality of ink droplets are actually ejected and the plurality of nozzles 21 in any of the nozzle rows NLm, NLc, NLy from which the plurality of ink droplets are actually ejected are shown by filled black circles with the common nozzle numbers in a column of the first scanning operation (the first pass). The any one of the nozzle rows NLm, NLc, NLy may be hereinafter referred to as "color nozzle row". That is, in FIG. 8, the common nozzle numbers with the filled black circles indicate that one or more of the plurality of nozzles 21 in the nozzle row NLk corresponding to the common nozzle numbers with the filled black circles actually eject the plurality of ink droplets in the first scanning operation and the one or more of the plurality of nozzles 21 in the color nozzle row corresponding to the common nozzle numbers with the filled black circles actually eject the plurality of ink droplets in the first scanning operation. Moreover, the common nozzle numbers with filled gray circles indicate that one or more of the plurality of nozzles 21 in the nozzle row NLk corresponding to the common nozzle number with the filled gray circles actually eject the plurality of ink droplets in the first scanning operation while the one or more of the plurality of nozzles 21 in the color nozzle row corresponding to the common nozzle numbers with the filled gray circles do not actually eject the plurality of ink droplets in the first scanning operation.

As described above with reference to FIG. 7, the ejection of the plurality of ink droplets from the plurality of nozzles 21 in the nozzle row NLk is not performed in each of the second scanning operation (the second pass) and the third scanning operation (the third pass). Accordingly, the common nozzle numbers with empty circles in a column of each of the second scanning operation (the second pass) and the third scanning operation (the third pass) indicate that one or more of the plurality of nozzles 21 in the nozzle row NLk corresponding to the common nozzle numbers with the empty circles do not actually eject the plurality of ink droplets in each of the second scanning operation and the third scanning operation, and the one or more of the plurality of nozzles 21 in the color nozzle row corresponding to the common nozzle numbers with the empty circles do not actually eject the plurality of ink droplets in each of the second scanning operation and the third scanning operation. On the other hand, the filled black circles in the column of each of the second scanning operation (the second pass) and the third scanning operation (the third pass) indicate that the ejection of the plurality of ink droplets from the one or more of the plurality of nozzles 21 in the color nozzle row is performed in each of the second scanning operation and the third scanning operation while the ejection of the plurality of ink droplets from the one or more of the plurality of nozzles 21 in the black nozzle row NLk is not performed in each of the second scanning operation and the third scanning operation. As illustrated in FIG. 8, the one or more of the plurality of nozzles 21 in the color nozzle row corresponding to the filled black circles in the column of the second pass and the third pass relatively moves by a distance d1 with respect to the printed medium W at every scanning operation.

As described above, as illustrated in FIG. 8, in the first printing process, after performing the pass-printing in the first scanning operation and conveying the printed medium W by one pitch Pt as the first distance d1 by the pair of conveying rollers 15, the controller 71 performs the pass-printing in the second scanning operation in the interlaced-printing. Moreover, after performing the pass-printing in the second scanning operation and conveying the printed medium W by one pitch Pt as the first distance d1 by the pair of conveying rollers 15, the controller 71 performs the pass-printing in the third scanning operation in the interlaced-printing. As a result of this, the partial image PR1 in the first printing process is formed. It is noted that the first distance d1 is not limited to the above described one pitch Pt.

Next, the controller 71 controls the conveying motor 31 to convey the printed medium W by a third distance d3 by the pair of conveying rollers 15 so as to form the next partial image PR2 before performing the fourth scanning operation (the fourth pass) of the carriage 16. In FIG. 8, as an example, the third distance d3 corresponds to two hundred and eight pitches Pt. It is noted that the third distance d3 is not limited to the above described two hundred and eight pitches Pt.

Then, the controller 71 controls the ejection head 20 to perform the pass-printing in the fourth scanning operation (the fourth pass) in the similar manner to the pass-printing in the above described first scanning operation, controls the ejection head 20 to perform the pass-printing in the fifth scanning operation (the fifth pass) in the similar manner to the pass-printing in the above described second scanning operation, and controls the ejection head 20 to perform the pass-printing in the sixth scanning operation (the sixth pass) in the similar manner to the pass-printing in the above described third scanning operation. As a result of this, the partial image PR2 in the first printing process is formed. The controller 71 controls the ejection head 20 to form the whole image by repeating the above described operations at every three scanning operations in the first printing process.

On the other hand, the controller 71 executes the second printing process when it is determined that the state of the ejection of the particular one nozzle 21 is in the second state. That is, the controller 71 executes the second printing process in a case where the ejection of the plurality of ink droplets from the particular one nozzle 21 is not in the normal state. There will be described in details the second printing process below.

In FIG. 9, (i) the common nozzle numbers with the filled black circles (the common nozzle numbers with the filled black circles in the column of the first scanning operation and the common nozzle numbers with the filled black circles in the column of each of the second scanning operation and the third scanning operation), (ii) the common nozzle numbers with the filled gray circles and (iii) the common nozzle numbers with the empty circles mean the same meaning as the common nozzle numbers in FIG. 8. Moreover, the common nozzle numbers with dotted circles in FIG. 9 indicate the same meaning as the common nozzle numbers with the empty circles in FIG. 8 in the meaning of the definition in which the plurality of nozzles 21 in the nozzle row NLk and the plurality of nozzles 21 in the color nozzle row do not eject the plurality of ink droplets. However, the common nozzle numbers with the dotted circles in FIG. 9 indicate that one or more of the plurality of nozzles 21 corresponding to the common nozzle numbers with the dotted circles do not eject the plurality of ink droplets in the forming of the single partial image PR, so as to form the image having predetermined resolution, due to a larger conveying amount than a conveying amount of the printed medium W in the first printing process conveyed at every timing when the pass-printing is completed. The conveying amount of the printed medium W does not correspond to a distance conveyed after the last pass (the third pass, for example) for forming the partial image PR is completed. Specifically, the conveying amount of the printed medium W corresponds to the distance d1 or a distance d2, which will be described below, but does not correspond to the distance d3 or a distance d4, which will be described below. In the second printing process, the plurality of nozzles 21 includes the plurality of nozzles 21 used in the interlaced-printing and the plurality of nozzles 21 not used in the interlaced-printing.

As described above, as illustrated in FIG. 9, in the second printing process, after performing the pass-printing in the first scanning operation and conveying the printed medium W by the second distance d2 by the pair of conveying rollers 15, the controller 71 performs the pass-printing in the second scanning operation in the interlaced-printing. The second distance d2 is a distance corresponding to four pitches Pt. That is, the second distance d2 in the second printing process is larger than the first distance d1 in the first printing process. Moreover, after performing the pass-printing in the second scanning operation and conveying the printed medium W by four pitches Pt as the second distance d2 by the pair of conveying rollers 15, the controller 71 performs the pass-printing in the third scanning operation in the interlaced-printing. As a result of this, the partial image PR1 in the second printing process is formed. It is noted that the second distance d2 is not limited to the above described four pitches Pt.

Next, the controller 71 controls the conveying motor 31 to convey the printed medium W by the fourth distance d4 by the pair of conveying rollers 15 so as to form the next partial image PR2 before performing the pass-printing in the fourth scanning operation (the fourth pass) of the carriage 16. In FIG. 9, the fourth distance d4 corresponds to one hundred and ninety-six pitches Pt, for example. That is, the fourth distance d4 in the second printing process is less than the third distance d3 in the first printing process. It is noted that the fourth distance d4 is not limited to the above one hundred and ninety-six pitches Pt.

Then, the controller 71 controls the ejection head 20 to perform the pass-printing in the fourth scanning operation in the similar manner to the pass-printing in the above described first scanning operation in the second printing process, controls the ejection head 20 to perform the pass-printing in the fifth scanning operation (the fifth pass) in the similar manner to the pass-printing in the above described second scanning operation in the second printing process, and controls the ejection head 20 to perform the pass-printing in the sixth scanning operation (the sixth pass) in the similar manner to the pass-printing in the above described third scanning operation in the second printing process. As a result of this, the partial image PR2 in the second printing process is formed. The controller 71 controls the ejection head 20 to form the whole image by repeating the above described operations at every three scanning operations in the second printing process.

When compared between the scanning operation in FIG. 8 related to the first printing process executed when it is determined that the state of the ejection is in the first state and the scanning operation in FIG. 9 related to the second printing process executed when it is determined that the state of the ejection is in the second state, the number of the plurality of nozzles 21 (the nozzles with the common nozzle numbers with the dotted circles) which are not used in the interlaced-printing is less in the case where it is determined that the state of the ejection is in the first state than in the case where it is determined that the state of the ejection is in the second state. In other words, the number of the plurality of nozzles 21 which are used in the interlaced-printing is relatively larger in the case where it is determined that the state of the ejection is in the first state than in the case where it is determined that the state of the ejection is in the second state.

Here, in a case where determining, based on image data (image data of the partial image PR), that the particular one nozzle of the plurality of nozzles 21 which is determined that the state of the ejection of the particular one nozzle 21 is in the second state does not need to eject the plurality of ink droplets, the controller 71 executes the first printing process in the interlaced-printing even when it is determined that the state of the ejection of the particular one nozzle 21 is in the second state and the second printing process should be executed. The plurality of nozzles 21 includes (i) one or more of the plurality of nozzles 21 which are determined that the state of the ejection is in the first state, that is, which are in the normal state, and (ii) one or more of the plurality of nozzles 21 which are determined that the state of the ejection is in the second state, that is, which are not in the normal state. More specifically, in a case where one nozzle 21 to which the common nozzle number 200 is attached in FIG. 9, for example, is a nozzle determined that the state of the ejection is in the second state, when it is determined based on the image data that the one nozzle 21 to which the common nozzle number 200 is attached does not need to eject the plurality of ink droplets, the controller 71 executes the first printing process. That is, the controller 71 controls the conveying motor 31 to convey the printed medium W by a relative small conveying amount at every time the pass-printing is completed in the forming of the single partial image PR, and conveys the printed medium W by a relative large conveying amount after completion of forming the single partial image PR.

Moreover, in a case where determining that a color of the plurality of ink droplets ejected from the particular one nozzle of the plurality of nozzles 21 which is determined that the state of the ejection is in the second state is a first color as a predetermined color, the controller 71 executes the first printing process in the interlaced-printing even when the state of the ejection of the particular one nozzle 21 is in the second state and the second printing process should be executed. In the present embodiment, the first color is the yellow color, and color difference between the yellow color and the color of a white streak is not large. Accordingly, in the ejection head 20, the nozzle row NLy corresponds to a nozzle row ejecting the plurality of ink droplets with the first color, and any one nozzle row of the nozzle row NLm, the nozzle row NLc, and the nozzle row NLk corresponds to a nozzle row ejecting the plurality of ink droplets with a second color. More specifically, in FIG. 9, for example, one nozzle 21 to which the common nozzle number 200 is attached corresponds to the one nozzle 21 which is determined that the state of the ejection is in the second state, and in a case where the color of the plurality of ink droplets ejected from the one nozzle 21 is the yellow color, the controller 71 executes the first printing process.

Moreover, in a case where jamming of the printed medium W is detected by the sensor 75, the controller 71 executes the second printing process in the interlaced-printing. In this case, there is a high possibility that the printed medium W comes into contact with the nozzle surface 40*a* of the ejection head 20 due to an occurrence of the jamming of the printed medium W. As a result of this, there is a possibility that an ejection failure occurs. Accordingly, the controller 71 executes the second printing process when the jamming of the printed medium W is detected. That is, the controller 71 controls the conveying motor 31 to convey the printed medium W by the relative small conveying amount at every time the pass-printing is completed in the forming of the single partial image PR, and conveys the printed medium W by the relative large conveying amount after the completion of forming the single partial image PR.

Figure 10:
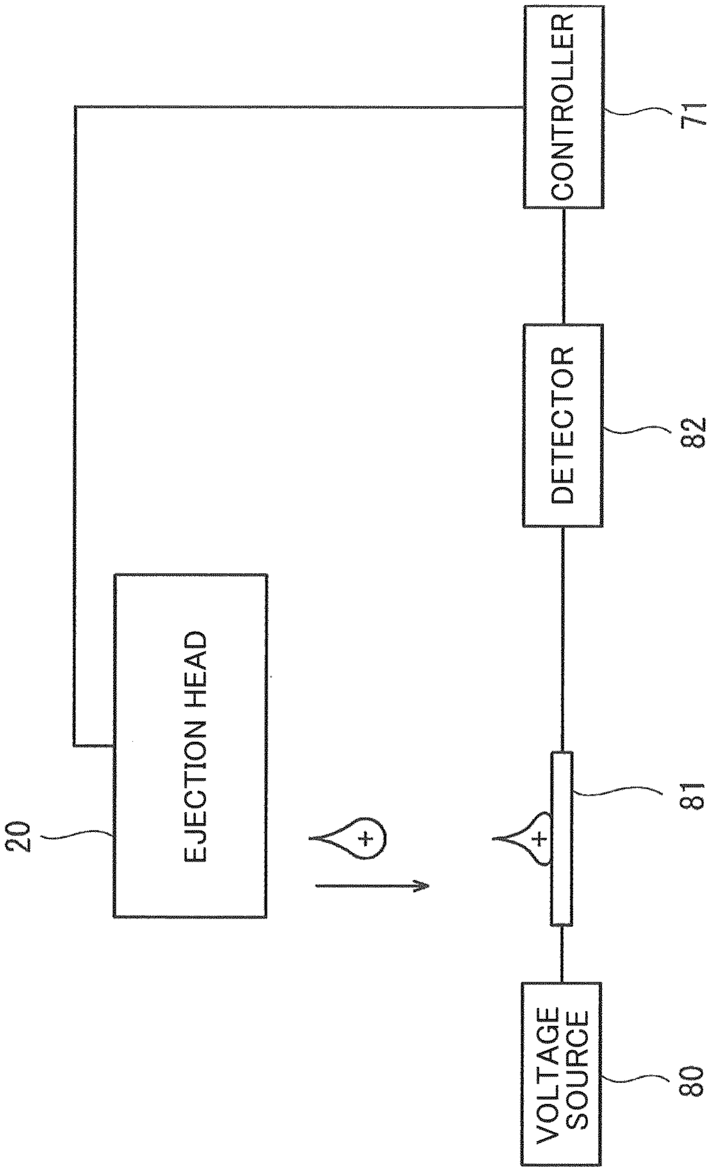
FIG. 10 is a block diagram illustrating a configuration of detecting an abnormality of the nozzle in the ejection head.

Next, there will be described a configuration of detecting an abnormality of the plurality of nozzles 21 of the ejection head 20. FIG. 10 is a block diagram illustrating the configuration of detecting the abnormality of the plurality of nozzles 21 in the ejection head 20.

As illustrated in FIG. 10, an electrode 81 is provided below the ejection head 20. The electrode 81 is a base material having electric conductivity, and the electrode 81 is a metal plate, for example. The voltage source 80 applies a high voltage to the electrode 81 when the plurality of ink droplets are ejected from the ejection head 20. In this situation, when the plurality of ink droplets, ejected from the ejection head 20 and bearing electrical charges, land on the electrode 81, the voltage on the electrode 81 changes. The detector 82 detects the change of the voltage of the electrode 81. In this case, an amount of electrical charge of the plurality of ink droplets is proportional to a volume of the plurality of ink droplets. Accordingly, a degree of the change of the voltage is based on the volume of the plurality of ink droplets. As a result of this, the controller 71 can determine the second state in which the amount of the plurality of ink droplets by the same ejection-instruction from the controller 71 to the same particular one nozzle of the plurality of nozzles 21 is the second amount less than the first amount of the ink droplets in the first state by the same ejection-instruction from the controller 71 to the same particular one nozzle of the plurality of nozzles 21 by detecting the change of the voltage by the detector 82. It is noted that the configuration of detecting the abnormality of the plurality of nozzles 21 of the ejection head 20 is not limited to the above described configuration, and various conventional configurations can be used.

Figure 11:
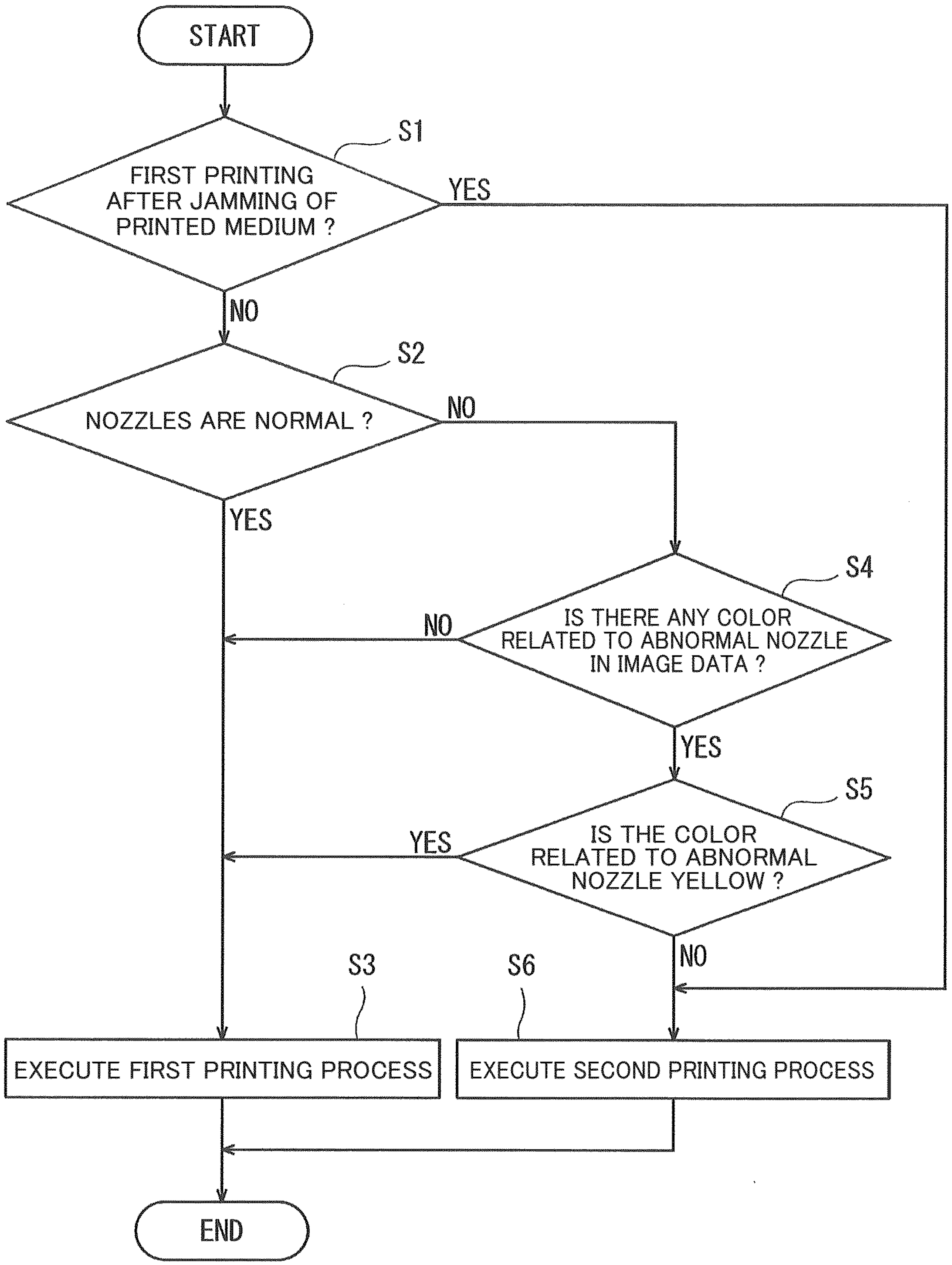
FIG. 11 is a flow chart illustrating a control flow executed by the controller.

FIG. 11 is a flow chart illustrating a control flow executed by the controller 71. As illustrated in FIG. 11, the controller 71 determines whether printing to be currently performed is the printing performed first after detecting the jamming of the printed medium W by the sensor 75, or not at step S1. When it is determined that the printing to be currently performed is the printing performed first after detecting the jamming (step S1: YES), the controller 71 executes the second printing process in the above described manner at step S6.

On the other hand, when it is determined that the printing to be currently performed is not the printing performed first after detecting the jamming (step S1: NO), the controller 71 determines whether the particular one nozzle of the plurality of nozzles 21 is in the normal state or not at step S2. When it is determined that the particular one nozzle of the plurality of nozzles 21 is in the normal state (step S2: YES), the controller 71 executes the first printing process at step S3. On the other hand, when it is determined that the particular one nozzle of the plurality of nozzles 21 is not in the normal state (step S2: NO), the controller 71 determines whether there is color information of the plurality of ink droplets ejected from the particular one nozzle of the plurality of nozzles 21 in the image data or not at step S4.

When it is determined that there is not the color information of the plurality of ink droplets ejected from the particular one nozzle of the plurality of nozzles 21 in the image data (step S4: NO), the controller 71 executes the first printing process at step S3. On the other hand, when there is the color information of the plurality of ink droplets of the plurality of nozzles 21 in the image data (step S4: YES), the controller 71 determines whether the color information indicates the yellow color or not at step S5.

When it is determined that the color information indicates the yellow color (step S5: YES), the controller 71 executes the first printing process at step S3. On the other hand, when it is determined that the color information does not indicate the yellow color (step S5: NO), the controller 71 executes the second printing process at step S6.

As described above, according to the present embodiment, in the case where it is determined that the state of the ejection of the particular one nozzle of the plurality of nozzles 21 is in the second state in which the amount of the plurality of ink droplets ejected from the particular one nozzle of the plurality of nozzles 21 based on the instruction from the controller 71 to the particular one nozzle 21 is less than the amount of the plurality of ink droplets ejected from the particular one nozzle of the plurality of nozzles 21 based on the same instruction from the controller 71 to the particular one nozzle 21 which is in the first state, the controller 71 controls the conveying motor 31 to convey the printed medium W by the second distance d2 larger than the first distance d1 in the conveying direction Df after the previous pass-printing and before the succeeding pass-printing. As a result of this, two raster lines formed by the particular one nozzle of the plurality of nozzles 21 are not adjacent to each other in the conveying direction Df. That is, the raster line formed by the particular one nozzle 21 in the previous pass-printing and the raster line formed by the particular one nozzle 21 in the succeeding pass-printing are not adjacent to each other in the conveying direction Df. As a result of this, it is possible to prevent the situation in which a white streak, caused by the ejection failure of the particular one nozzle of the plurality of nozzles 21, in the raster line formed in the previous pass-printing and a white streak in the raster line formed in the succeeding pass-printing are adjacent to each other in the conveying direction Df when the state of the ejection of the particular one nozzle of the plurality of nozzles 21 is in the second state. Accordingly, this makes it difficult to notice the white streak and it is possible to suppress deterioration of image quality. On the other hand, in the case where it is determined that the state of the ejection of the particular one nozzle of the plurality of nozzles 21 is in the first state in which of the state of the ejection of the particular one nozzle of the plurality of nozzles 21 is in the normal state, the controller 71 controls the conveying motor 31 to convey the printed medium W by the first distance d1 less than the second distance d2 in the conveying direction Df after the previous pass-printing and before the succeeding pass-printing. As a result, the number of the plurality of nozzles 21 which are used for forming the partial image PR becomes relatively large. Accordingly, it is possible to increase a speed of printing.

Moreover, in the present embodiment, the controller 71 controls the conveying motor 31 to convey the printed medium W by the third distance d3 by the pair of conveying rollers 15 in the first printing process, and the controller 71 controls the conveying motor 31 to convey the printed medium W by the fourth distance d4 less than the third distance d3 by the pair of conveying rollers 15 in the second printing process. As a result of this, the number of the pass-printing in the first printing process in which the state of the ejection of the particular one nozzle of the plurality of nozzles 21 is in the normal state becomes small. Accordingly, the speed of printing becomes large. On the other hand, the number of the pass-printing in the second printing process in which the state of the ejection of the particular one nozzle of the plurality of nozzles 21 is not in the normal state, that is, in the abnormal state, becomes large, and the speed of printing in the second printing process becomes small in accordance with the image data. However, in this case, since the number of the pass-printing is increased, it is possible to suppress deterioration of image quality.

Moreover, in the present embodiment, the number of the one or more of the plurality of nozzles 21 which are not used in the interlaced-printing performed when it is determined that the state of the ejection is in the first state is less than the number of one or more of the plurality of nozzles 21 which is not used in the interlaced-printing performed when it is determined that the state of the ejection is in the second state. That is, the number of one or more of the plurality of nozzles 21 which is used in the interlaced-printing performed in the first state is relatively larger than the number of one or more of the plurality of nozzles 21 which are used in the interlaced-printing performed in the second state. As a result of this, the number of the pass-printing performed in the first printing process executed when it is determined that the state of the ejection is in the first state becomes relatively small. Accordingly, the speed of printing becomes large.

Moreover, in the present embodiment, in the case where determining, based on the image data of the partial image PR, that the particular one nozzle of the plurality of nozzles 21 which is determined that the state of the ejection is in the second state do not need to eject the plurality of ink droplets, the controller 71 executes the first printing process in the interlaced-printing even when it is determined that the state of the ejection of the particular one nozzle of the plurality of nozzles 21 is in the second state and the second printing process should be executed. In this case, it is possible to prevent the situation in which the number of the plurality of nozzles 21 which are used in the interlaced-printing becomes small. Accordingly, since the number of the plurality of nozzles 21 is increased, it is possible to increase the speed of printing.

Moreover, in the present embodiment, in the case where determining that the color of the plurality of ink droplets ejected from the particular on nozzle of the plurality of nozzles 21 which is determined that the state of the ejection is in the second state is the yellow color, the controller 71 executes the first printing process in the interlaced-printing even when the state of the ejection of the particular one nozzle of the plurality of nozzles 21 is in the second state and the second printing process should be executed. In this case, since the color difference between the yellow color and the color of the white streak is not large, it is difficult to notice the streak with the yellow color. Accordingly, it is possible to increase the speed of printing by executing the first printing process.

Moreover, in the present embodiment, the ejection head 20 includes the high-density nozzle row NL2 (the nozzle rows NLk) and the three low-density nozzle rows NL1 (the nozzle rows NLm, NLc, NLy) each of which is the nozzle row having the smaller number of the plurality of nozzles 21 than the high-density nozzle row NL2. The high-density nozzle row NL2 is the nozzle row by which the pass-printing is performed once while the single partial image, which is the part of the whole image, is formed in the color printing, and each of the three low-density nozzle rows NL1 is the nozzle row by which the pass-printing is performed three times while the single partial image is formed in the color printing. According to the configuration of the ejection head 20, it is possible to suppress deterioration of image quality of each of the partial images PR constituting the whole image in the color printing.

Moreover, in the present embodiment, in the case where the jamming of the printed medium W is detected by the sensor 75, the controller 71 executes the second printing process in the interlaced-printing. When the jamming of the printed medium W occurs, it is easy to cause the ejection failure in any one or more nozzles of the plurality of nozzles 21. Accordingly, the controller 71 executes the second printing process when the jamming is detected. As a result of this, it is suppress deterioration of image quality.

MODIFICATIONS

While the disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the disclosure, and not limiting the disclosure. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described disclosure are provided below:

In the above described embodiment, the ejection head 20 includes the high-density nozzle row NL2 and the three low-density nozzle rows NL1, however, the present disclosure is not limited to this. From the view point of suppressing deterioration of image quality by making the white streak unnoticed, the ejection head may include a plurality of nozzle rows each having the same density of a plurality of nozzles.

Moreover, in the above described embodiment, the number of abnormal nozzles of the plurality of nozzles 21 which is determined when the second printing process is executed may be at least one.

Moreover, in the above described embodiment, the jamming of the printed medium W is detected by the sensor 75, however, the method of detecting the jamming is not limited to this. For example, the jamming may be detected based on a conveying period of time from a timing when a leading edge of the printed medium W reaches a particular position to a timing when a trailing edge of the printed medium W passes the particular position. The controller 71 determines that the jamming does not occur when the period of time is less than a predetermined period of time. In this case, the printed medium W is conveyed without problems. On the other hand, the controller 71 determines that the jamming occurs when the period of time is equal to or larger than the predetermined period of time. In this case, the printed medium W is not normally conveyed.

Moreover, in the above described embodiment, the controller 71 determines that the particular one nozzle of the plurality of nozzles 21 is in the abnormal state by detecting the change of the voltage on the electrode 81 by the detector 82, however, the method of determining the abnormality of the particular one nozzle of the plurality of nozzles 21 is not limited to this. For example, it may be determined by the following method. In this method, a pressure wave is applied to the plurality of ink droplets in the plurality of nozzles 21 by the driving of the actuator 60. This pressure wave remains as residual vibration on the plurality of ink droplets in the pressure chamber 28 after the plurality of ink droplets are ejected from the plurality of nozzles 21. Accordingly, the residual vibration deforms the stationary actuator 60, and the deformed actuator 60 causes electrical current. A dimension of the electrical current caused by the residual vibration depends on the volume of the plurality of ink droplets. Accordingly, the abnormality of the particular one nozzle of the plurality of nozzles 21 may be determined based on the detected dimension of the electrical current caused by the actuator 60.

Moreover, the abnormality of the particular one nozzle of the plurality of nozzles 21 may be determined by the following method as another example. In this method, the actuator 60 receives heat from the plurality of ink droplets via the vibrating plate 55. A capacitance of the actuator 60 changes in accordance with the heat from the plurality of ink droplets. That is, the capacitance of the actuator 60 depends on the temperature of the plurality of ink droplets. Moreover, the temperature of the plurality of ink droplets depends on the volume of the plurality of ink droplets. Accordingly, the abnormality of the particular one nozzle of the plurality of nozzles 21 may be determined based on the capacitance of the actuator 60.

Moreover, in the above described embodiment, the single ejection head 20 is mounted on the carriage 16, however, the present disclosure is not limited to this. Two or more ejection heads 20 may be mounted on the carriage 16. Moreover, in a case where an ejection head which ejects ultraviolet-curable type ink is used, a light source unit may be mounted on the carriage 16 in addition to the ejection head 20.

What is claimed is:

1. A liquid ejecting apparatus, comprising:

an ejection head including a nozzle row having a plurality of nozzles arranged in a row at predetermined pitches, a plurality of liquid droplets being ejected on a printed medium from the plurality of nozzles;

a carriage configured to move in a moving direction, the ejection head being mounted on the carriage;

a conveyor configured to convey the printed medium in a direction intersecting the moving direction; and a controller configured to:

execute an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction;

determine whether a state of ejection of the plurality of liquid droplets of the plurality of nozzles is in a first state or a second state, a particular one nozzle of the plurality of nozzles in the nozzle row ejecting a first amount of liquid by an ejection-instruction from the controller to the particular one nozzle of the plurality of nozzles in the first state, the particular one nozzle of the plurality of nozzles ejecting a second amount of liquid less than the first amount of liquid by the same ejection-instruction from the controller to the particular one nozzle of the plurality of nozzles in the second state;

when it is determined that the state of the ejection of the plurality of nozzles is in the first state, execute a first printing process, the controller being configured, in the first printing process, to: (i) perform a previous pass-printing, (ii) convey the printed medium by the conveyor by a first distance after the previous pass-printing, and (iii) perform a succeeding pass-printing after the conveyance of the printed medium in the interlaced-printing, the first distance corresponding to a first number of pitches of the plurality of nozzles; and when it is determined that the state of the ejection of the plurality of nozzles is in the second state, execute a second printing process, the controller being configured, in the second printing process, to: (i) perform the previous pass-printing, (ii) convey the printed medium by the conveyor by a second distance larger than the first distance after the previous pass-printing, and (iii) perform the succeeding pass-printing after the conveyance of the printed medium, in the interlaced-printing, the second distance corresponding to a second number of pitches of the plurality of nozzles, the second number being larger than the first number.

2. The liquid ejecting apparatus according to claim 1, wherein the controller is configured to:

when it is determined that the state of the ejection of the plurality of nozzles is in the first state, convey the printed medium by the conveyor by a third distance before a succeeding partial image is formed and after a previous partial image is formed, the succeeding partial image being formed successively after the previous partial image; and when it is determined that the state of the ejection of the plurality of nozzles is in the second state, convey the printed medium by the conveyor by a fourth distance less than the third distance before the succeeding partial image is formed and after the previous partial image is formed.

3. The liquid ejecting apparatus according to claim 2, wherein the plurality of nozzles include at least one nozzle used in the interlaced-printing and at least one nozzle not used in the interlaced-printing, and wherein a number of the at least one nozzle not used in the interlaced-printing is less than a number of the at least one nozzle used in the interlaced-printing.

4. The liquid ejecting apparatus according to claim 1, wherein the plurality of nozzles include the particular one nozzle, and wherein, in a case where it is determined, based on image data of the partial image, that there is no need to eject the plurality of liquid droplets from the particular one nozzle of the plurality of nozzles, the controller is configured to execute the first printing process in the interlaced-printing even when it is determined that the state of the ejection of the plurality of nozzles is in the second state.

5. The liquid ejecting apparatus according to claim 1, wherein the plurality of nozzles includes the particular one nozzle, wherein the ejection head includes a plurality of nozzle rows each as the nozzle row, the plurality of nozzle rows including a first nozzle row having a plurality of first nozzles and a second nozzle row having a plurality of second nozzles, a plurality of liquid droplets with a first color being ejected from the plurality of first nozzles of the first nozzle row, a plurality of liquid droplets with a second color being ejected from the plurality of second nozzles of the second nozzle row, and wherein, in a case where a color of the plurality of liquid droplets ejected from the particular one nozzle of the plurality of nozzles is the first color, the controller is configured to execute the first printing process in the interlaced-printing even when it is determined that the state of the plurality of nozzles is in the second state.

6. The liquid ejecting apparatus according to claim 1, wherein the ejection head includes a first-density nozzle row and a second-density nozzle row each as the nozzle row and each having the plurality of nozzles, the partial image being formed by a single time of the pass-printing by the first-density nozzle row, the partial image being formed by at least two times of the pass-printing by the second-density nozzle row, a density of the plurality of nozzles in the first-density nozzle row being larger than a density of the plurality of nozzles in the second-density nozzle row.

7. The liquid ejecting apparatus according to claim 1, further comprising a sensor configured to detect an occurrence of jamming of the printed medium, wherein the controller is configured to execute the second printing process in the interlaced-printing when the jamming of the printed medium is detected by the sensor.

8. A liquid ejecting method for a liquid ejecting apparatus, the liquid ejecting apparatus including:

an ejection head including a nozzle row having a plurality of nozzles arranged in a row at predetermined pitches, a plurality of liquid droplets being ejected on a printed medium from the plurality of nozzles;

a carriage configured to move in a moving direction, the ejection head being mounted on the carriage; and a conveyor configured to convey the printed medium in a direction intersecting the moving direction, wherein the liquid ejecting method comprises:

executing an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction;

determining whether a state of ejection of the plurality of liquid droplets of the plurality of nozzles is in a first state or a second state, a particular one nozzle of the plurality of nozzles in the nozzle row ejecting a first amount of liquid by an ejection-instruction to the particular one nozzle of the plurality of nozzles in the first state, a particular one nozzle of the plurality of nozzles ejecting a second amount of liquid less than the first amount of liquid by the same ejection-instruction to the particular one nozzle of the plurality of nozzles in the second state;

when it is determined that the state of the ejection of the plurality of nozzles is in the first state, executing a first printing process, in the first printing process, (i) a previous pass-printing being performed, (ii) the printed medium being conveyed by the conveyor by a first distance after the previous pass-printing, and (iii) a succeeding pass-printing being performed after the conveyance of the printed medium, in the interlaced-printing, the first distance corresponding to a first number of pitches of the plurality of nozzles; and when it is determined that the state of the ejection of the plurality of nozzles is in the second state, executing a second printing process, in the second printing process, (i) the previous pass-printing being performed, (ii) the printed medium being conveyed by the conveyor by a second distance larger than the first distance after the previous pass-printing, and (iii) the succeeding pass-printing being performed after the conveyance of the printed medium, in the interlaced-printing, the second distance corresponding to a second number of pitches of the plurality of nozzles, the second number being larger than the first number.

9. A non-transitory recording medium storing a plurality of instructions executable by a computer of a liquid ejecting apparatus, the liquid ejecting apparatus including:

an ejection head including a nozzle row having a plurality of nozzles arranged in a row at predetermined pitches, a plurality of liquid droplets being ejected on a printed medium from the plurality of nozzles;

a carriage configured to move in a moving direction, the ejection head being mounted on the carriage; and a conveyor configured to convey the printed medium in a direction intersecting the moving direction, wherein, when executed by the computer, the plurality of instructions cause the liquid ejecting apparatus to:

execute an interlaced-printing, at least two times of pass-printing being performed in the interlaced-printing such that a partial image is formed on the printed medium, the partial image having resolution higher than resolution of an image constituted by dots spaced at the predetermined pitches of the plurality of nozzles, the plurality of liquid droplets being ejected from the plurality of nozzles in the pass-printing while the carriage moves in the moving direction;

determine whether a state of ejection of the plurality of liquid droplets of the plurality of nozzles is in a first state or a second state, a particular one nozzle of the plurality of nozzles in the nozzle row ejecting a first amount of liquid by an ejection-instruction to the particular one nozzle of the plurality of nozzles in the first state, the particular one nozzle of the plurality of nozzles ejecting a second amount of liquid less than the first amount of liquid by the same ejection-instruction to the particular one nozzle of the plurality of nozzles in the second state;

when it is determined that the state of the ejection of the plurality of nozzles is in the first state, execute a first printing process, in the first printing process, (i) a previous pass-printing being performed, (ii) the printed medium being conveyed by the conveyor by a first distance after the previous pass-printing, and (iii) a succeeding pass-printing being performed after the conveyance of the printed medium, in the interlaced-printing, the first distance corresponding to a first number of pitches of the plurality of nozzles; and when it is determined that the state of the ejection of the plurality of nozzles is in the second state, execute a second printing process, in the second printing process, (i) the previous pass-printing being performed, (ii) the printed medium being conveyed by the conveyor by a second distance larger than the first distance after the previous pass-printing, and (iii) the succeeding pass-printing being performed after the conveyance of the printed medium, in the interlaced-printing, the second distance corresponding to a second number of pitches of the plurality of nozzles, the second number being larger than the first number.

* * * * *